Nov. 22, 1966   A. S. NICHOLAS   3,287,061
HOLDER FOR SEAT BELTS

Filed Oct. 2, 1964   2 Sheets-Sheet 1

INVENTOR.
ARTHUR S. NICHOLAS
BY
ATTORNEYS

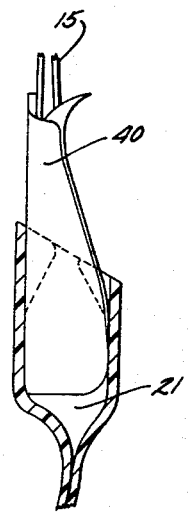
FIG. 4.
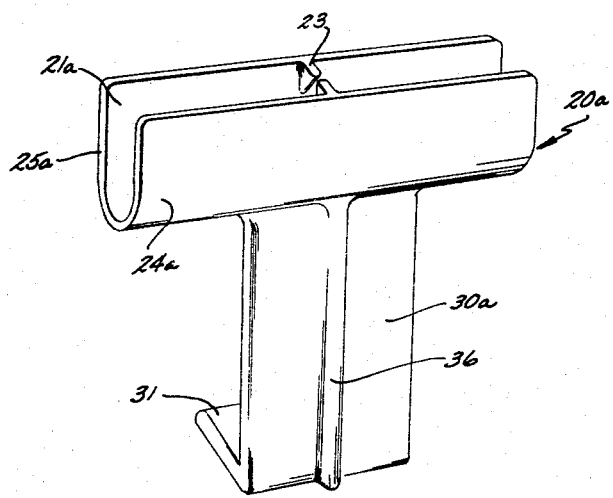
FIG. 5.
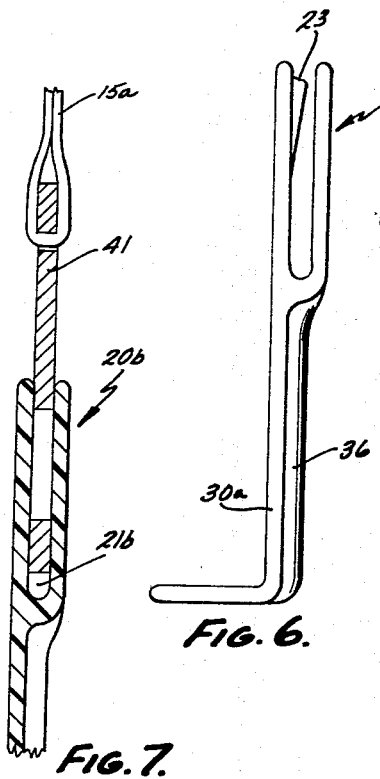
FIG. 6.
FIG. 7.
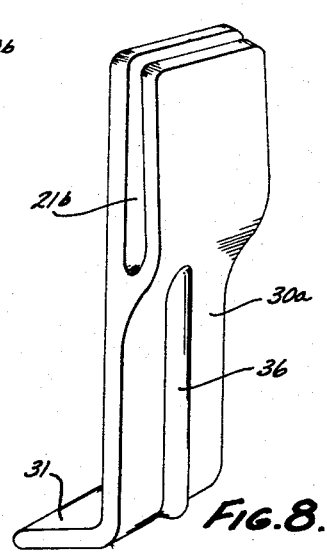
FIG. 8.
INVENTOR.
ARTHUR S. NICHOLAS
BY
ATTORNEYS United States Patent Office 3,287,061
Patented Nov. 22, 1966

3,287,061
HOLDER FOR SEAT BELTS
Arthur S. Nicholas, 915 Carrier Creek Blvd.,
Grand Rapids, Mich.
Filed Oct. 2, 1964, Ser. No. 401,123
2 Claims. (Cl. 297—385)

This invention relates to storage means for safety belts for vehicles. While this invention may be used in several locations with respect to the seating of a vehicle, it is particularly adapted to solve the problem of safety belt storage at the center of the seat in a vehicle having continuous seat cushions extending from one side to the other. It is applicable to both the front and rear seats.

In the single seat cushion arrangement, the portions of the safety belts which are anchored at the outer edges of the seat are normally provided with retractors. However, the portions of the safety belts which are anchored at the center of the seat cushion are not so equipped for safety reasons. While they normally cannot fall to the floor or hang out the side of the vehicle to become dirty and generally disheveled, they do present a problem. Frequently, they are not laid out neatly and the person, on entering the vehicle, sits on them. This makes it difficult and uncomfortable to straighten them out ready for use. They also become twisted. If the person places heavy packages or other materials on the seat beside him, one end of the belt is often buried beneath the load. The end result is that the seat belt frequently is not used because it is too much bother to disentangle and free it for use.

The problem of providing effective belt storage at the center of the seat is more difficult than at the sides of the seat. In the absence of retractors, it is not practical to store the belts in the joint between the seat and back cushions. Even if retractors are used, the result is a hard, unyielding mass on the seat which is most uncomfortable in the event a third person is riding in the center of the seat. First, the belt cannot readily be made to fold up into this area. Secondly, any attempted storage pocket of such size as to take at least two belts creates the same problem as retractors in the event the seat is used for three people.

Conventional storage units used at the front of the seat also create serious problems. Because of the possibility of use of the seat by a third pasesnger, it is essential that such a storage facility does not present a hard surface against the passenger's legs. Otherwise, it can damage clothing and cause personal injury. Further, it must be of a material which will not mark clothing. The unit must be compact so that it does not project from the front edge of the seat in such a manner as to press against the passenger's body and thus, make the seat uncomfortable. The same situation applies even in the absence of the use of the seat by a third person because not infrequently people enter a car from the opposite side and slide across the seat. Again, it is essential that the storage unit for the buckles be such that it does not interfere with this maneuver.

This invention provides a storage facility for the seat buckles which will keep them in neat and usable order. It is compact and holds the buckles where they are readily available to the passengers. It is quick and easy to use and, therefore, encourages the use of seat belts. The invention may be installed as original equipment, or it may be installed as an accessory in equipment of earlier manufacture. The invention encourages the use of safety belts by keeping them neat and readily available. It also encourages their use by placing them on the seats where their presence reminds the user that they should be buckled before starting the car.

These and other objects and advantages of this invention will be readily understood by those acquainted with safety belt equipment, upon reading the following specification and the accompanying drawings.

In the drawings:

FIG. 4 is a sectional view showing a typical use of the invention;

FIG. 5 is an oblique view of a modified form of this invention;

FIG. 6 is an end elevation view of a modified form of the invention shown in FIG. 5;

FIG. 7 is a fragmentary sectional view of the forms of the invention shown in FIGS. 6 and 8, showing the keeper plate stored in the pocket of the holder;

FIG. 8 is an oblique view of a further modified form of the invention.

In executing the objects and purposes of this invention, there is provided a buckle holder which in its preferred form has a pair of compartments for holding either the latching or the keeper plate portions of a safety belt buckle. The unit is designed with a standard or stem which holds it above the floor of the vehicle in a convenient position for use. It is designed of a material which has sufficient rigidity to properly support the weight of the safety belt buckle, while at the same time, providing sufficient flexibility that it will flex in the event a passenger presses against it.

Figure 1:
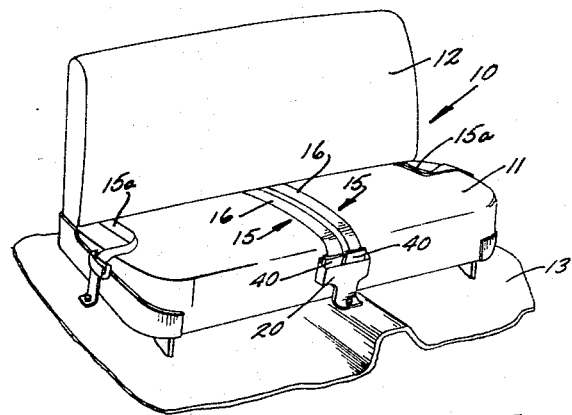
FIG. 1 is an oblique, fragmentary view of a vehicle seat equipped with this invention.

Referring specifically to FIG. 1, the numeral 10 indicates a seat having a seat cushion 11 and a back cushion 12. The seat is secured by any suitable means to the floor panel 13 of a vehicle (the vehicle not being illustrated). In the particular construction illustrated, the floor has the conventional central raised tunnel portion 14 which passes lengthwise of the vehicle under the seat 10. The vehicle seat is equipped with safety belts each of which has two portions, one the latch portion 15 and the other the keeper portion 15a. Each of the belts is firmly secured to the floor panel 13 by means not shown since the particular anchorage of the belts to the floor does not enter into this invention.

It will be noted from FIG. 1 that the latch portions 15 of the belts are secured in side-by-side relationship at the center of the seat with the webs 16 of the belts extending into the seat through the joint between the seat and back cushions 11 and 12. The invention provides a storage means for the buckles 40 at the free ends of these portions of the safety belts.

Figure 3A:
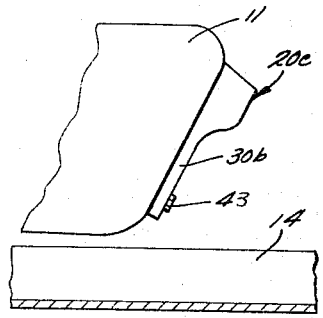
FIG. 3A is a fragmentary, side elevation view showing a modified form of the invention.
Figure 2:
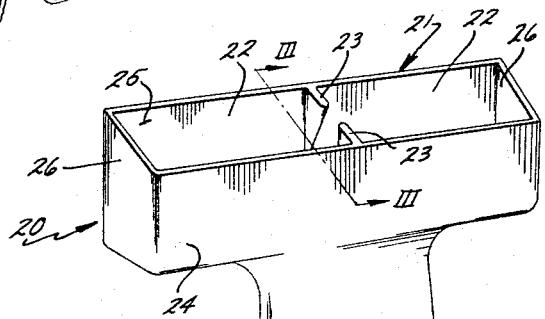
FIG. 2 is an enlarged, oblique view of this invention.
Figure 3:
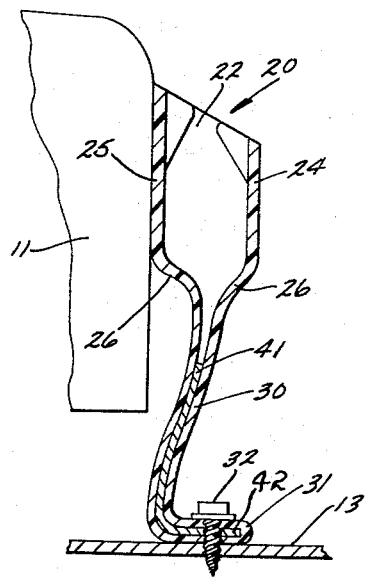
FIG. 3 is a sectional, elevation view taken along the plane III—III of FIG. 2.

The invention as best seen in FIGS. 2 and 3 is a storage member 20 having at its upper end an elongated pocket 21 divided into a pair of side-by-side compartments 22 by a pair of fins 23 at the center of the pocket 21. The pocket is surrounded by a front wall 24, a rear wall 25 and a pair of end walls 26. The rear wall 25 is significantly higher than the front wall 24 forming an open top to the pocket which is sloped downwardly and forwardly. The bottom of the pocket is defined by the bottom wall 27.

It will be noted that the fins 23 project from both the front and the rear walls toward each other, but in the embodiment shown, do not extend entirely across the pocket. The purpose of this construction will be explained subsequently. The fins provide a guide for the buckles 40, and serve the purpose of preventing the buckles from sliding from one compartment into the other. Since the buckles are metal, preventing contact between them will eliminate scratching and other damage which might occur if the buckles rub against each other. It also prevents the buckles from making noisy contact which would be undesirable.

The entire pocket structure is supported by a stem 30. The stem consists of an extension of the bottom walls 27, but is of substantially lesser width than the length of the pocket 21. The stem is of such length that it supports the top of the pocket 21 just below the top surface of the seat cushion 11, where it will not interfere with the proper use of the seat cushion. Preferably, it is sufficiently below this top surface that when a person uses the center of the seat, the depression of the cushion will not permit the person's body to come in contact with the top of the storage member. Thus, the precise length of the stem 30 will depend on the construction of the vehicle involved. If the vehicle has a tunnel such as the tunnel 14 illustrated in FIG. 1, the stem will be considerably shorter than in the case of a unit built for a vehicle having no tunnel. In the latter case, the stem will be considerably longer because the distance to the floor will be greater.

The bottom end of the stem 30 has a foot piece 31. The foot piece 31 is bent over and a suitable fastener 32 such as a self-tapping screw or a bolt is installed through the hole 33 to firmly secure the foot piece to the floor panel 13. Since this invention provides storage only, it is unnecessary for it to provide the structure required to withstand the loads incident to emergency use of the belts.

The entire storage member 20 is preferably formed from an abrasion resistant, synthetic, resinous material. The material is selected and has a wall thickness that the pocket structure is somewhat flexible, has plastic memory, and has sufficient rigidity to readily support the weight of the buckle. An example of such a material is a vinyl polymer having a wall thickness of $\frac{1}{16}$ to $\frac{5}{32}$ of an inch. The polymers chosen are ones which produce a reasonably stiff wall and good plastic memory when cured. Theses materials also are particularly satisfactory because they are unaffected by oil, grease, water and other chemicals such as sodium chloride and calcium chloride to which they may be subjected in normal use. These are the types of solvents and corrosive materials which are most frequently introduced into the car on the shoes of the passengers. Further, these resins may be colored to match the decor of the vehicle and will not mark clothing or other objects with which they come into contact. They have sufficient flexibility that a passenger contacting the storage member will not suffer injury since the material will flex, and presents no sharp or resistant cutting edge.

In the making of the storage member from these materials, it is normally molded about a mandrel. A tongue of the mandrel projects down through the pocket and extends the length of the stem. As such, it produces a hollow structure with the foot piece portion constituting a straight extension of the sem. Only when the unit is mounted, is the foot piece portion bent at an angle to permit it to lie parallel to the floor panel. Thus, within a limited range adjustment of the length of the upright portion of the stem can be made at the point of installation by positioning the point at which the bend is made to form the foot piece.

Since the material has significant rigidity, plastic memory, and yet has sufficient flexibility to permit the bending, incident to the formation of the foot piece, the bend will bias the entire stem and pocket portion rearwardly toward the face of the seat. This has several desirable effects. First, by pressing the pocket firmly against the front of the seat cushion, it assures the pocket lying close to the seat face where it will be most convenient and out of the way of passengers. Further, the seat will then act as a supporting factor for the pocket since it will be acting against the natural resilient forces of the plastic material which has been bent in the formation of the foot piece. Also, this, in effect, tends to pre-stress the stem and thus, increase its strength.

It will be recognized that in the foot piece portion, the tightening of the fastener 32 by which the foot piece is secured to the floor panel will collapse the tubular walls of the stem pressing them firmly together. The pre-stressing of the stem 30 in many cases will do the same thing.

The wall thickness of the molded resinous member can be reduced if a resilient reinforcing bracket 41 is inserted in the stem 30 (FIG. 3). This bracket may be made of any suitable material such as spring steel and is inserted after the storage member has been removed from the mold. In this case, the bent over foot portion 42 will be formed in the bracket and shape the storage member to have the foot piece 31 before it is installed. It will be noted that the upper end of the bracket 41 terminates below the pocket 21 and does not enter it. The bracket 41 resiliently biases the storage member firmly against the seat 11.

The use of the double fins 23 which do not bridge the complete distance between the front and rear walls permits the mandrel upon which the storage member is molded to be withdrawn.

FIG. 4 illustrates the use of the invention. In this view, the buckle 40 of the seat belt 15 is inserted in the pocket 21. It will be seen that the walls of the pocket firmly hold the buckle. As is clearly illustrated in FIG. 1, the invention holds the two buckles in side-by-side relationship at the front of the seat where they may be readily grasped by both the driver or the passenger. It holds the strap portion of the seat belt straight and neatly arranged across the surface of the seat where it will not be under either the driver or the passenger or any packages or other articles which may be placed on the seat beside the driver. Thus, they are always accessible and clearly visible where they will remind the users to fasten them before driving away. It will be noted that the position of the storage unit is such that it will not interfere with a passenger sitting in the center of the seat because it is below the top level of the seat cushion even when the seat cushion is depressed. Furthermore, it is nested so compactly against the front wall of the seat, it will not interfere with a person sliding across the seat.

FIG. 5 illustrates a modified form of the invention which is quite similar to the form shown in FIG. 2 except that the storage unit 20a has a pocket 21a in which the end walls have been omitted. Also, the stem 30a is reinforced with a rib 36. In this case, it may be desirable to somewhat increase the wall thickness of the front and rear walls 24a and 25a to compensate for the loss of support from the end walls.

FIGS. 7 and 8 show the structure of FIG. 5 applied to a single compartment type of storage unit and particularly designed for the keeper plate portion of the belt buckle. In this case, the pocket 21b of the storage member 20b is considerably narrower, whereby the keeper plate 41 when inserted seats down in the pocket and is gripped by the walls to hold it with sufficient firmness to assure its remaining in the pocket without falling out.

FIG. 3A illustrates a modification in which the storage member 20c is designed to be bolted directly to the front face of the seat cushion 11 by an attachable fastener 43. In this construction, the foot piece is eliminated and the attachment bolt is mounted through the lower end of the stem 30b. Preferably, within the stem 30b is a reinforcement bracket of suitable material such as spring steel similar to the bracket 41. This arrangement has the distinct advantage of permitting the storage member to move back and forth with the seat when the passenger adjusts the seat's position.

It will be seen that this invention provides a simple, neat and attractive solution to the problem of the storage of seat belt buckles when not in use, particularly for vehicles having a full width seat, and thus, equipped with double belts at the center of the seat.

It will be understood that throughout this description and in the following claims, unless specifically designated otherwise, the term "buckle" is intended to apply to both parts of the conventional two-piece buckle assembly. Thus, the term embraces either the latch or the keeper portions of the buckle.

Having described a preferred embodiment of my invention, together with some modifications of this embodiment, that which is claimed to be patentable is described in the hereinafter appended claims.

I claim:
1. In combination with a vehicle having a floor panel and a seat above said floor panel, said seat having a generally upright front wall, a storage pocket for safety belt buckles having a generally tubular body member the upper portion of said body member being shaped to provide a pair of spaced upstanding side walls joined to each other intermediate the ends of said body member and defining an upwardly opening buckle receiving pocket; the remainder of said body member having its walls pressed together to provide an elongated stem integral with the bottom of said pocket, said body member being molded of resilient synthetic resinous material characterized by plastic memory and having sufficient rigidity to stand erect and support the weight of buckles stored in said buckle receiving pocket while said pocket is supported on said stem; an integral foot formed on said stem by the folding of the lower end portion of said stem and extending at a substantial angle to seat against said floor panel and a detachable fastener being mounted through a said foot portion for anchoring said storage pocket to said floor panel; said folding of said foot portion creating a resilient bias firmly pressing one side wall of said buckle receiving pocket against said seat; the lower portion of said stem and said foot portion being resiliently reinforced to assure said resilient bias.

2. The combination recited in claim 1 wherein said reinforcement of said lower end portion of said stem and of said foot portion is a resilient bracket seated within said stem and foot portions.

References Cited by the Examiner
UNITED STATES PATENTS

| | | | |
|---|---|---|---|
| 2,855,028 | 10/1958 | Matthews | 297—388 |
| 2,945,275 | 7/1960 | Almeter | 297—385 X |
| 2,964,100 | 12/1960 | McCall | 297—388 |
| 3,126,227 | 3/1964 | Bollinger | 297—385 |
| 3,126,228 | 3/1964 | Greene | 297—385 |
| 3,147,995 | 9/1964 | Bohlin | 297—385 |
| 3,171,688 | 3/1965 | Nicholas | 297—388 |

References Cited by the Applicant
UNITED STATES PATENTS

| | | |
|---|---|---|
| 2,488,858 | 11/1949 | Franz. |
| 2,830,655 | 4/1958 | Lalande. |
| 3,046,056 | 7/1962 | Greene et al. |

FRANK B. SHERRY, *Primary Examiner.*

J. S. PETRIE, *Assistant Examiner.*